Nov. 24, 1931.　　　P. LANDROCK　　　1,833,399
CAMERA
Filed March 26, 1926　　　7 Sheets-Sheet 1

Nov. 24, 1931.   P. LANDROCK   1,833,399
CAMERA
Filed March 26, 1926   7 Sheets-Sheet 2

Fig. 2

INVENTOR
Paul Landrock
BY
his ATTORNEYS

Nov. 24, 1931.   P. LANDROCK   1,833,399
CAMERA
Filed March 26, 1926    7 Sheets-Sheet 3
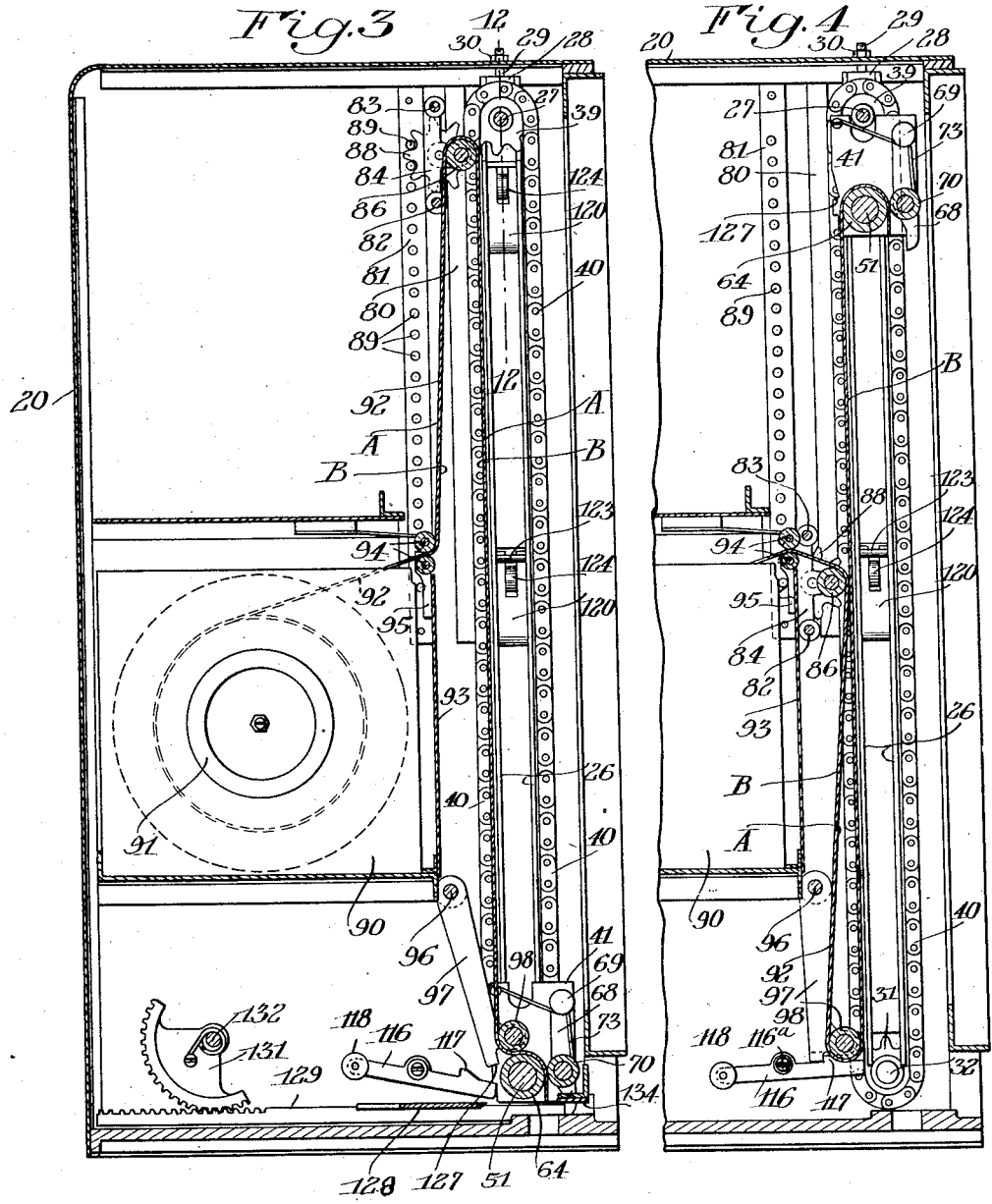
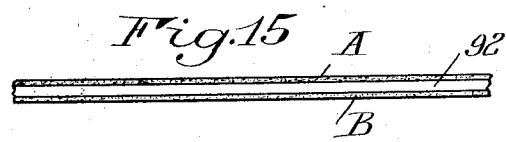
INVENTOR
Paul Landrock
BY
his ATTORNEYS Nov. 24, 1931.　　　P. LANDROCK　　　1,833,399
CAMERA
Filed March 26, 1926　　　7 Sheets-Sheet 4

INVENTOR
Paul Landrock
BY
his ATTORNEYS

Nov. 24, 1931.  P. LANDROCK  1,833,399
CAMERA
Filed March 26, 1926  7 Sheets-Sheet 5
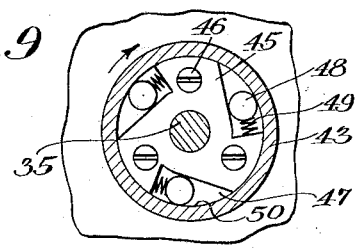
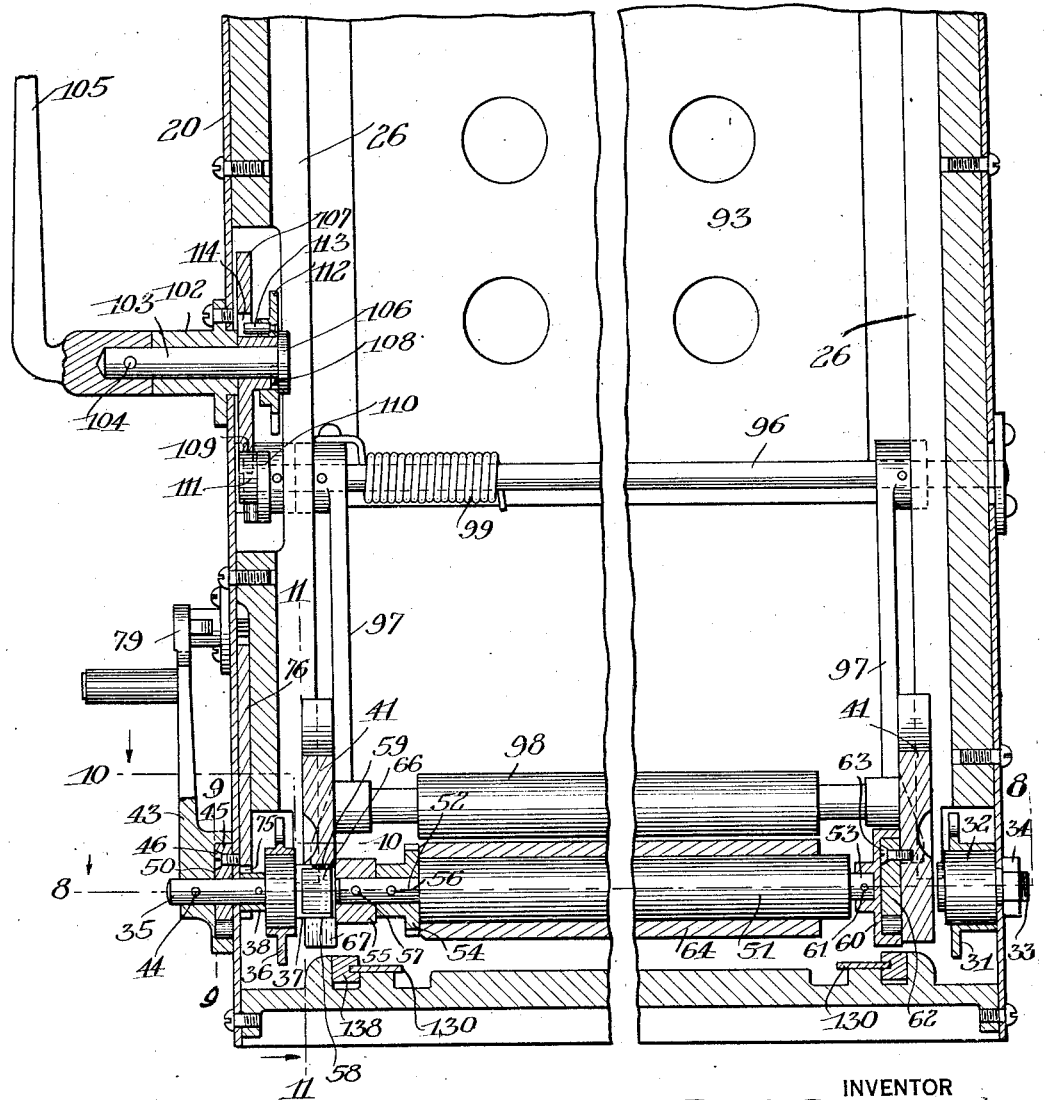
INVENTOR
Paul Landrock
BY
his ATTORNEYS

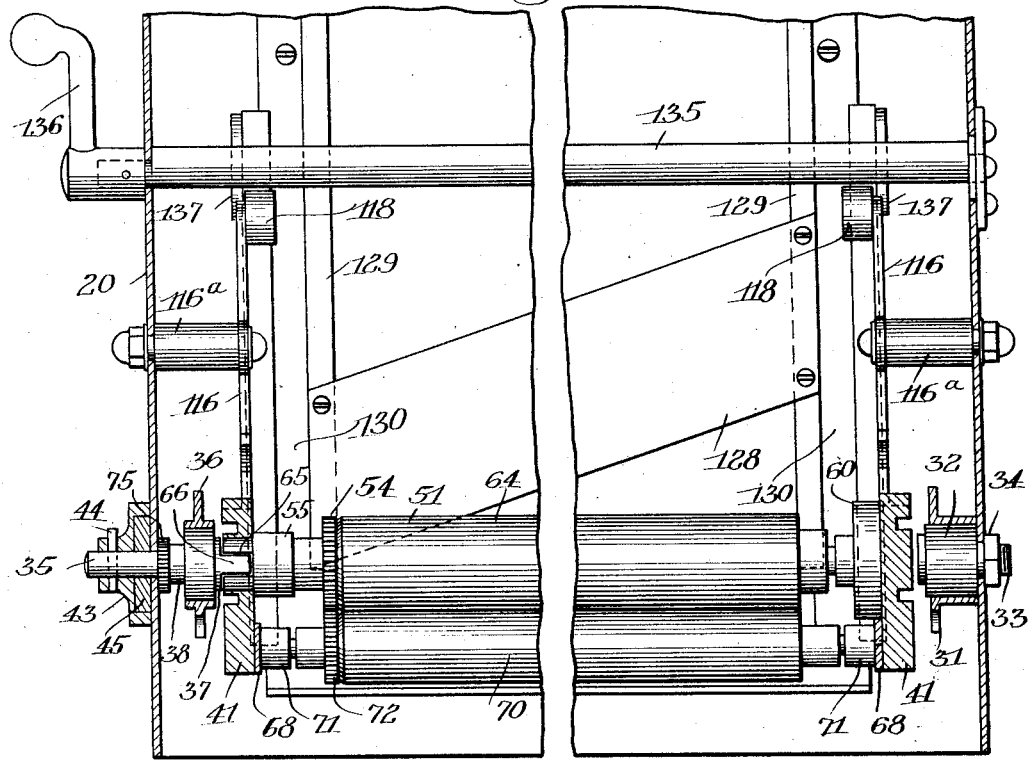
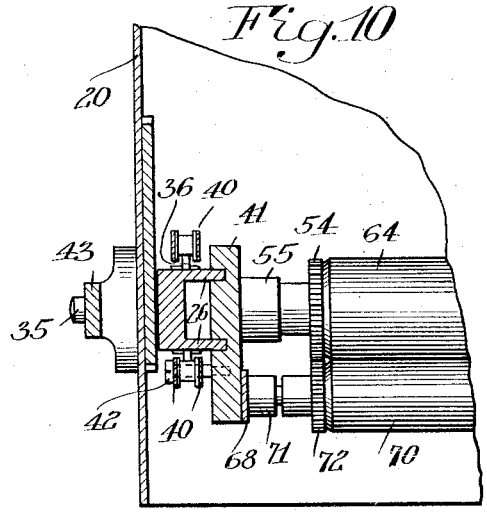
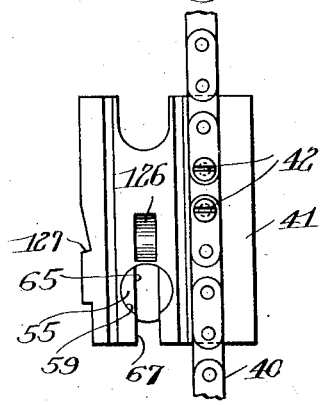

Nov. 24, 1931.    P. LANDROCK    1,833,399
CAMERA
Filed March 26, 1926    7 Sheets-Sheet 7
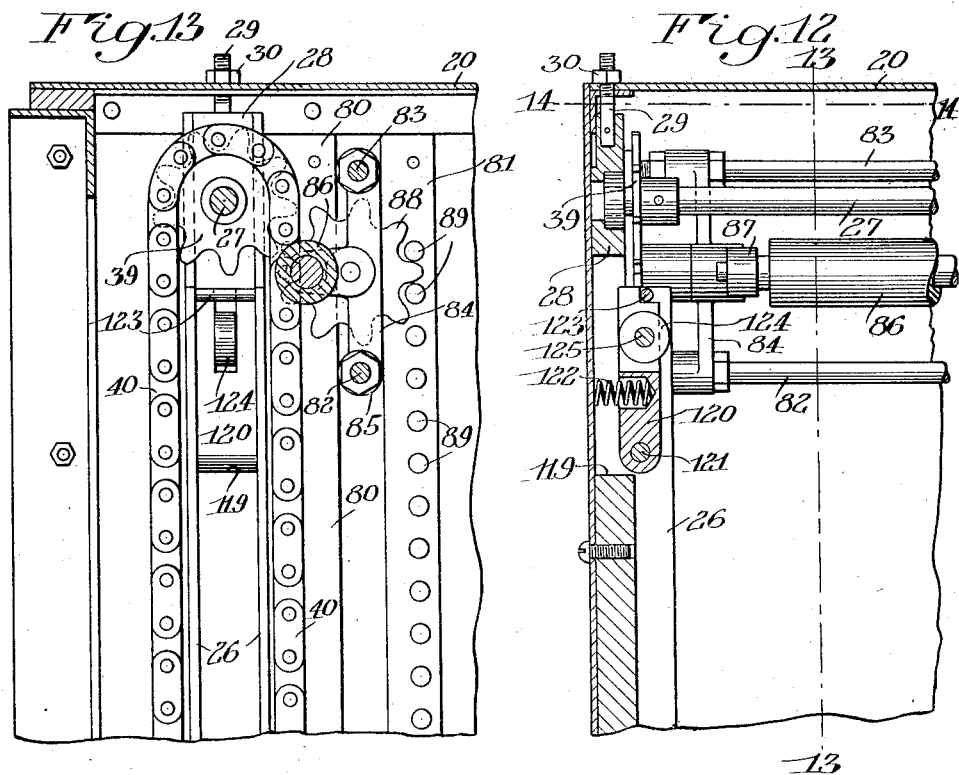
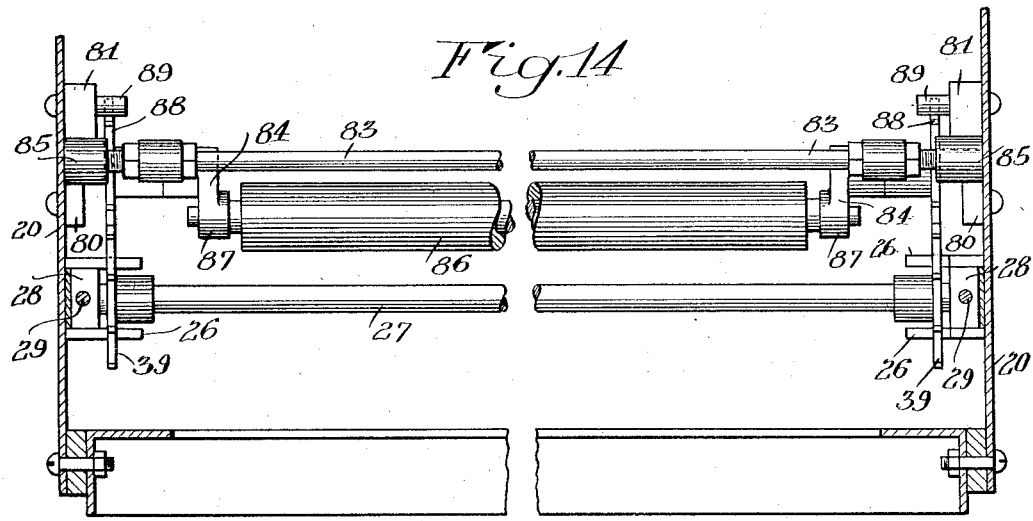
INVENTOR
Paul Landrock
BY
his ATTORNEYS Patented Nov. 24, 1931

1,833,399

UNITED STATES PATENT OFFICE

PAUL LANDROCK, OF ROCHESTER, NEW YORK, ASSIGNOR TO PHOTOSTAT CORPORATION, OF PROVIDENCE, RHODE ISLAND, A CORPORATION OF RHODE ISLAND

CAMERA

Application filed March 26, 1926. Serial No. 97,498.

This invention relates to photography, and more particularly to the commercial type of photographic machines which may be employed, for example, in the copying of documents and the like.

An object of the invention is to improve and simplify such machines, particularly with respect to the mechanism for feeding the film strip and supporting it in exposure positions.

A further object is to provide such a simplified and improved machine for the handling of duplex film in a simple, convenient and practical manner.

A still further object is to provide such an improved machine which will be relatively simple, durable, compact and inexpensive.

Various other objects and advantages will be apparent from the following description of an embodiment of the invention, and the novel features will be particularly pointed out hereinafter in connection with the appended claims.

The invention contemplates an improvement of the machine whereby images may be photographed successively upon both faces of any sections of the film strip in a simple manner, without material movement of the main body or supply of film strip, and without severance of the section to be exposed from the unused part of the supply strip, whereby any film section to be exposed may always be presented in the proper focal plane regardless of which face is presented for exposure, and whereby any film section may be shifted to present either face for exposure by simple manipulations.

In the accompanying drawings:—

Figure 2 is an elevation of the cabinet portion of the same, with the elevation viewed approximately along the line 2—2 of Figure 1;

Figure 3 is a sectional elevation of the cabinet part of the same with the section taken approximately along the line 3—3 of Figure 2 and illustrating the film strip in position for an exposure of one face;

Figure 4 is a similar elevation but with the film section shifted to present its other face for exposure;

Figure 7 is a sectional elevation through a portion of the cabinet, with the section taken approximately along the line 7—7 of Figure 5;

Figure 8 is a sectional plan of a portion of the device, with the section taken approximately along the line 8—8 of Figure 7;

Figure 9 is a sectional elevation through a one-way clutch forming part of the paper feeding mechanism, the section being taken approximately along the line 9—9 of Figure 7;

Figure 10 is a sectional plan of a portion of the device, with the section taken approximately along the line 10—10 of Figure 7;

Figure 11 is an elevation of a section of a chain and carriage block, as viewed on the line 11—11 of Figure 7;

Figure 12 is a sectional elevation of a portion of the device, with the section taken approximately along the line 12—12 of Figure 3;

Figure 13 is a sectional elevation of the mechanism shown in Figure 12, with the section taken approximately along the line 13—13 of Figure 12;

Figure 14 is a sectional plan of the same, with the section taken approximately along the line 14—14 of Figure 12;

Figure 15 is a side elevation, on an enlarged scale of a portion of a film strip having both faces sensitized for use with this machine;

Figure 16 is a diagram illustrating the position of a section of the film strip for the exposure of one face thereof;

Figure 17 is a similar diagram but with the film section reversed to present its other face for exposure; and Figure 18 is a similar diagram, but illustrating and intermediate step in the change between the positions of Figures 16 and 17, and which position may be used for exposure of only a part of a face of the film strip.

Figure 1:
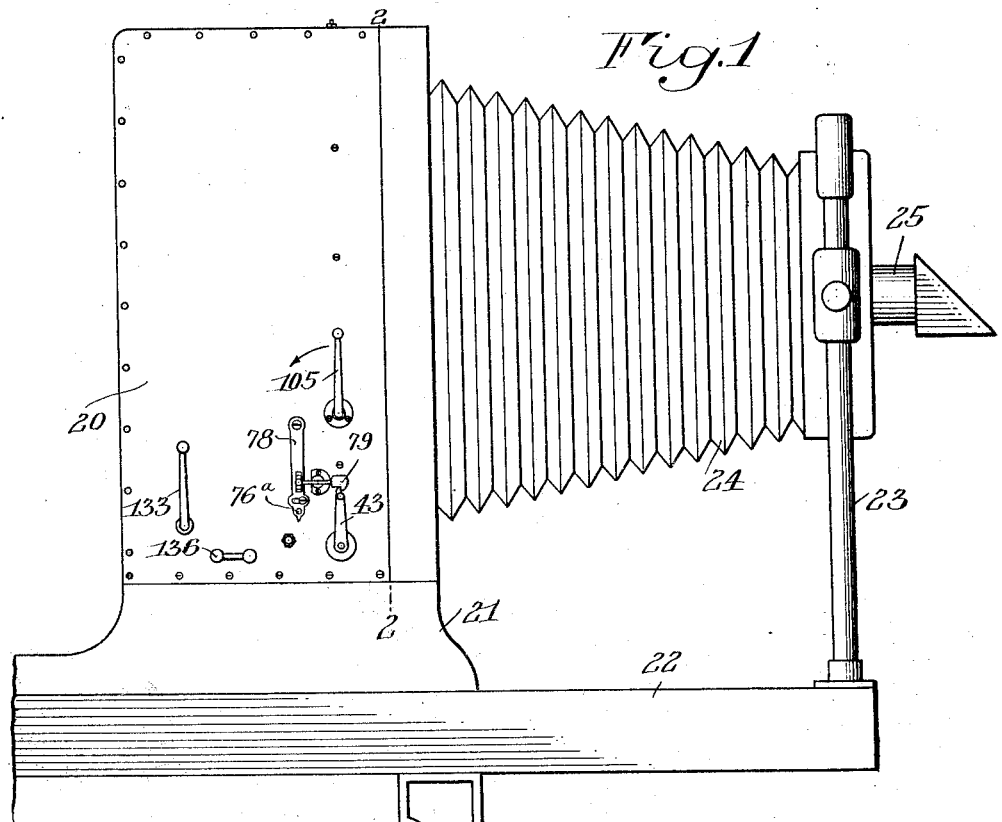
Figure 1 is a side elevation of a copying machine constructed in accordance with the invention.

In the illustrated embodiment of the invention, a suitable cabinet 20 (Figure 1) is mounted upon a base 21 which is shiftable along a table 22 as usual with the machines of this type. The table 22 may have upstanding posts 23 which support the forward end of a bellows element 24, the latter carrying at its forward end a suitable optical projection device 25 which may include the usual projection lenses and a refracting prism as usual in such machines.

The cabinet 20 may be entirely closed except for its opening into the bellows element, and is provided along the inner faces of opposite walls with parallel channel shaped strips 26, with the open faces of the channels facing one another. A shaft 27 extends across the interior of the cabinet directly above the channels 26, and at its ends is supported in blocks 28 (see Figures 3, 4, 12 and 13) which are guided vertically by the upper ends of the channel strips. A threaded rod 29 extends from each bearing block 28, upwardly through the top wall of the cabinet, and upon its outer end carries a nut 30, so that by rotation of the nuts 30, the two bearing blocks 28 may be drawn upwardly or lowered in order to raise or lower the shaft 27.

At the lower end of one of the channel strips 26, a sprocket wheel 31 (see Figure 7) is rotatably mounted upon a bearing stud 32, which is secured to the cabinet wall by a reduced stem portion 33 which carries a nut 34 upon its outer end and abutting the outer face of the cabinet wall. At the lower end of the other channel strip 26, a short shaft 35 is rotatably mounted in a cabinet wall in alignment with the bearing stud 32. A sprocket wheel 36 is rotatably mounted upon such shaft 35 between a head 37 thereof and a sleeve 38 which is fixed to the shaft and located between the sprocket wheel and the inner face of the cabinet wall through which the shaft 35 passes. The shaft 27 (Figure 2) is provided with sprocket wheels 39 adjacent its opposite ends and aligned with the sprocket wheels 31 and 36. Endless chains 40 are passed over the sprocket wheels at the ends of the channel strips, so as to drivingly connect the shaft 27 with both sprocket wheels 31 and 36.

A carriage block 41 (see Figures 2, 3, 4, 5 and 7) is slidingly supported upon each channel strip 26, so as to be shiftable therealong. Each block is connected to one of the stretches of chain between the shaft 27 and the other sprocket wheels, so as to be moved along the channel strips whenever the chains are operated. For example, the pivots of one or two chain links of each chain may be in the form of screws 42 (see Figure 11) which after passing through the chain links are threaded into the adjacent block, so as to provide a driving connection between the chain and block.

An operating handle 43 (see Figures 2, 7 and 8) is secured, such as by a pin 44, upon the outer end of the shaft 35 and abutting the outer face of the cabinet wall in which the shaft is rotatable. This handle prevents movement of the shaft 35 endwise through the wall in one direction, and the sleeve 38, which is also pinned to the shaft adjacent the inner face of the cabinet wall, prevents movement of the shaft endwise in the other direction. A disc 45 may be secured to the outer face of the cabinet wall and surrounding the shaft 35 in any suitable manner such as by screws 46 which pass through and are counter-sunk into the disc, and threaded into the cabinet wall.

A periphery of this disc 45 is provided with notches 47 (see Figure 9, particularly) for receiving clutch rollers or balls 48. The bottom walls of the notches extend obliquely toward the periphery of the disc, and suitable compression springs 49 act between an end wall of each notch and the roller or ball of that notch, so as to project the roller or ball wedgingly between the bottom wall of the notch and a peripheral wall of a recess 50 in the inner face of the base of the handle 43 in which the disc is received, as shown particularly in Figure 7. The balls or rollers 48 serve as one-way clutch elements and automatically prevent rotation of the shaft 35 and handle 43 in one direction, but permit free rotation thereof in the other direction, all for a purpose which will appear hereinafter.

A feed roller 51 (see Figure 7) is provided with reduced ends 52 and 53, the end 52 being longer than the end 53 and passing axially through a gear 54 and into a bearing bushing 55. The gear 54 and bushing 55 are fixed upon the end 52 of the roller in any suitable manner, such as by pins 56 and 57, respectively, which pass through the parts to be locked. The bushing 55 has a reduced end portion 58 which is rotatably received in an aperture 59 in the carriage block 41 that is adjacent the sprocket wheel 36. The bushing 55 thus serves to rotatably support the roller 51 in one of the carriage blocks 41.

The other end 53 of the roller 51 is received in an axial recess of a clutch element 60, being fixed therein in any suitable manner such as by a transversely extending locking pin 61. The clutch element 60 has a circular recess in its free end face which is rotatably mounted upon a circular disc 62, and the latter is secured, as by screws 63, to the exposed face of the other carriage block 41. The clutch element 60 thus serves to rotatably support the other end of the roller 51 upon the other carriage block 41.

The disc 62 is provided with notches in its periphery similar to the notches 47 of the one-way clutch adjacent the handle 43, and rollers or balls similar to those used for the one-way clutch connection to the handle 43 are provided in the notches of the disc 62 so as to provide a similar one-way clutch connection between the carriage block 41 and the roller 51. Thus the roller 51 will be held against rotation in one direction by both of these one-way clutches. The roller 51 may carry the usual soft rubber sleeve 64 for contact with a film strip as will be set forth hereinafter.

From the foregoing it will be obvious that when the endless chains 40 are operated to shift the blocks 41 along the channel strips 26, the roller 51, which is rotatably suported between the blocks 41, will be shifted across the interior of the cabinet. The reduced end of the bushing 55, however, which is rotatably received in one of the blocks 41 which is adjacent the sprocket wheel 36 is radially slotted at 65 (see Figs. 7 and 8) for some extent from its free end, so as to receive a tongue 66 which extends from the face of the head 37 of the shaft 35.

The lower end of the block 41 which mounts the bushing 55 is slotted to the bearing aperture 59, such slot 67 being of a width slightly greater than the thickness of the tongue 66 of the shaft 35. When the handle 43 is manipulated until the shaft 35 is rocked into such an angular position that the tongue 66 is in alignment with the slot 67 of the carriage block, the carriage block and roller may move along the channel strips, during which movement the tongue 66 relatively will slide out of the slot 65 of the bushing and through the slot 67 of the carriage block. If the handle 43 is in any other angular position, the tongue 66 will be out of alignment with the slot 67 and movement of the carriage blocks prevented.

An arm 68 (see Figures 2, 3, 5, 6 and 8) is pivoted, as by a shoulder screw 69, to each carriage block so as to depend along one side of the roller 51 the arms 68 being provided along the faces of the blocks 41 between which the roller 51 extends. An auxiliary feed roller 70 is rotatably supported in bearings 71 carried by said arms 68. The roller 70 is thus suspended like a bail between the carriage blocks and movable into and out of contact with the roller 51. The roller 70 is provided with a gear 72 which moves into meshing engagement with the gear 54 of the roller 51 as the roller 70 approaches contact with the roller 51. Thus the two rollers will be directly geared together for rotation in opposite directions so as to draw through between them an interposed strip of film as will appear hereinafter. Springs 73 may be coiled about the pivot screws 69, anchored at one end to the carriage block such as against an abutment screw 74, and at the other end against the bearing boss 71 of the adjacent arm 68, so as to normally urge said arms 68 and the roller 70 yieldingly towards the roller 51.

The sleeve 38 (see Figure 5, 7 and 8) may carry a suitable pinion 75 which meshes with a relatively large gear 76 which is pivotally secured against the inner face of the cabinet wall. This gear 76 (see Figure 5) may be provided with an aperture 77. A locking pin 76a (see Figure 1) may be provided upon a leaf spring 78, and passes through an aperture in the wall of the cabinet and yieldingly presses against the gear 76, so that when the aperture 77 moves into alignment with the pin, the pin will snap into the aperture 77 and lock the gear 76 against further rotation. This locking position is that in which the handle 43 is in the position to permit disengagement of the tongue 66 from the bushing 55 of the roller 51, as has been hereinbefore described.

The handle 43 may be locked against forward rotation by a latch lever 79 which is pivoted upon the cabinet for movement transversely of the plane of rotation of the handle 43, and which may be connected to the leaf spring 78 so that when the latch is shifted out of engagement with the handle 43, it will also shift the leaf spring 78 in a direction to withdraw the locking pin 76a carried thereby from the aperture 77 of the gear 76 and permit rotation of the feed roller 51.

A pair of rails 80 and 81 (see Figures 3, 4, 5, 13 and 14) are secured to the inner faces of the walls of the cabinet along which the channel strips extend, the rails 80 and 81 on each wall being slightly spaced apart to provide a guide groove between them, which groove extends approximately parallel to the channel strips. A pair of arms 82 and 83 (see Figures 2, 3, 12, 13 and 14) extend between and connect arms 84 that extend along the rails 80 and 81, the rods 82 and 83 extending through the arms 84 and carrying rollers 85 (see Figures 13 and 14) which run in the guide grooves between the rails 80 and 81. The rods 82 and 83 and arms 84 thus serve as an auxiliary carriage for a primary guide roller 86 which is rotatably mounted in ears 87 of the arms 84. Sprocket wheels 88 are rotatably mounted upon the arms 84 so as to abut face to face with the rails 80 and 81 and to mesh with adjacent stretches of the endless chains 40.

One of the rails such as 81 of the cabinet is provided with spaced pins 89, which with each rail forms a rack element with the pins as the teeth. These pins engage with the sprocket wheels 88 (see Figures 3, 13 and 14) and thus whenever the chains 40 are operated, the sprocket wheels 88 will be rotated and by reason of their engagement with the pins 89, the auxiliary carriage for the primary guide roller 86 will be shifted along the rails and in a direction approximately parallel to the travel of the carriage blocks 41. The carriage blocks 41 are connected to those stretches of the chain 40 which will cause travel of the blocks 41 in a direction reverse to the travel of the primary guide roller 86.

The cabinet is provided rearwardly of the channel strips 26 with a compartment 90, (Figure 3) having means for receiving and rotatably mounting a spool 91 of an unexposed photographic film strip 92, the mounting means being preferably frictional means (not shown) for retarding the rotation of the spool to some extent as usual in the art. Access to the compartment for the replacement or insertion of spools of film strip may be had by removing a door 93. (See Figure 3.)

A pair of guide rollers 94 are mounted in the cabinet to extend across the same just above the door 93 of the compartment 90, so as to receive between them the film strip 92 and conduct it forwardly in a manner to be explained presently. The door 93 may have lugs 95 which hook behind the supports for the rollers 94, and the lower end of the door may be frictionally held against the bottom wall of the cabinet. The guide rollers 94 are preferably disposed approximately midway across the limits of travel of the carriage blocks 41, and rearwardly of the path of travel of the primary roller 86. The film strip 92, after passing between the rollers 94, is conducted over the primary guide roller 86, then across the interior of the cabinet and between the feed rollers 70 and 51, between which it is resiliently clamped by the action of the springs 73.

A rod 96 (Figs. 3 to 7) extends across the interior of the cabinet and is rotatably supported in its opposite side walls which carry the channel strips 26. Arms 97 are fixed upon the rod 96 adjacent its ends and a secondary guide roller 98 is rotatably supported between the arms 97 so as to swing transversely of the direction of travel of the feed rollers 70 and 51. A spring 99 may be provided upon the rod 96, hooked over a screw 100 upon one of the arms 97, and at its other end hooked against a suitable part of the cabinet such as the lower front edge wall of the compartment 90. The spring serves to yieldingly swing the arms 97 and the secondary guide roller 98 into a position just above the feed roller 51 as shown in Figure 3, the forward position being determined in a manner to be explained hereinafter.

A bearing boss 102 (see Figure 7) is secured to a side wall of the cabinet and rotatably mounts a shaft 103. The outer end of the shaft is secured by pin 104 to an operating handle 105. The inner end of the shaft is provided with a head 106 which confines a cam disc 107 (see also Figures 5 and 6) against a slight projection on the bearing boss 102 that projects inwardly through the cabinet wall. The cam disc is keyed by a pin 108 to the shaft 103 for rotation therewith, and in its periphery is provided with a notch 109. (See Figures 5 and 6, particularly.) An arm 110 is fixed upon the rod 96, and carries a cam roller 111 which rides upon the periphery of the cam disc 107 and snaps into the notch 109 of the disc when the notch moves into alignment with the roller as shown in Figues 5 and 7. The engagement of the roller in the notch limits the forward movement of the secondary guide roller 98 as mentioned at the end of the preceding paragraph. When the cam disc 107 is rotated, the roller 98 will be shifted rearwardly from above the feed roller 51.

Figure 5:
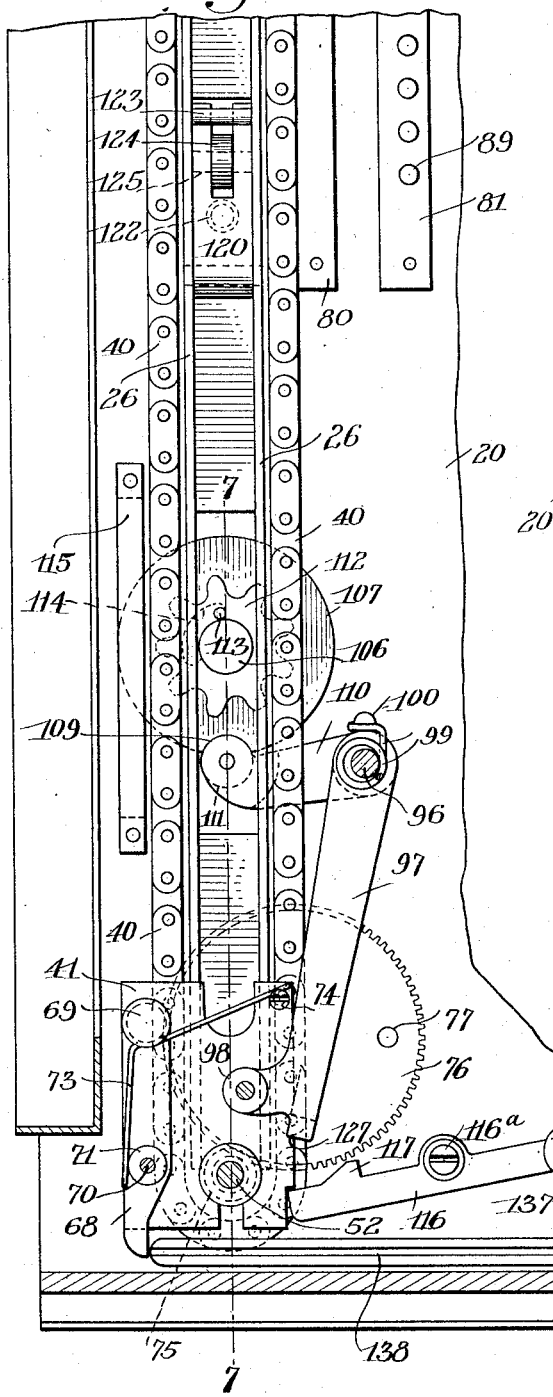
Figure 5 is a sectional elevation of a portion of the cabinet, with the section taken approximately along the line 5—5 of Figure 2, but with the parts drawn upon a slightly larger scale than that of Figure 2.
Figure 6:
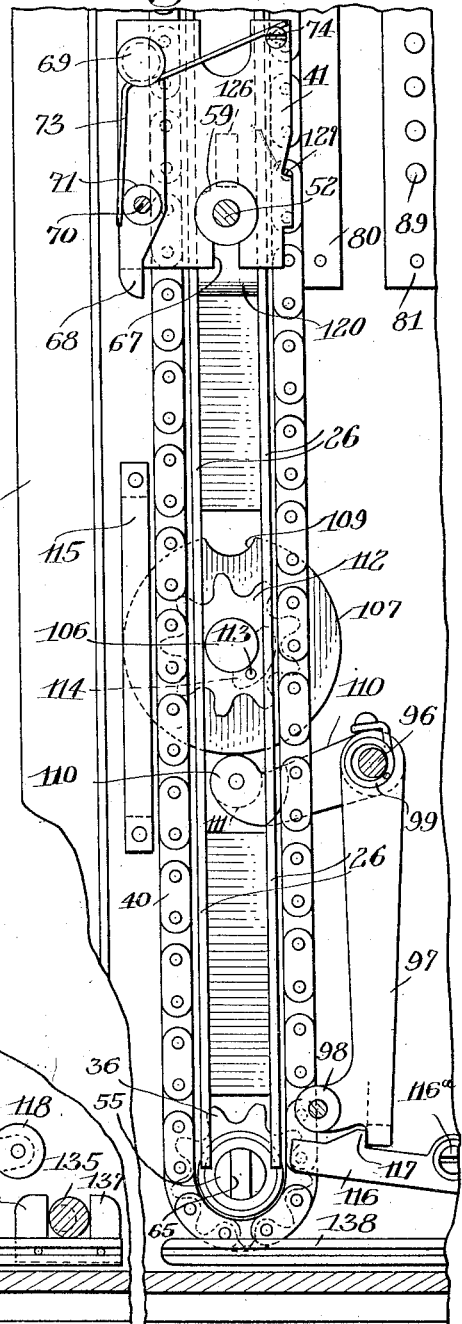
Figure 6 is an elevation similar to Figure 5 but illustrating the parts in a different operative position to one another, such as the relative positions occupied by the parts for exposure of half of a face of a film section.

Referring particularly to Figures 5, 6 and 7, a sprocket wheel 112 is rotatably mounted upon a boss of the cam disc and provided with a pin 113 which runs in an arcuate slot 114 of the cam disc 107. The pin 113 and slot 114 provide a lost-motion connection between the sprocket wheel 112 and the operating handle 105 and the cam disc. The sprocket wheel 112 may be disposed between the two stretches of the adjacent chain 40, so as to mesh with both stretches. Whenever the sprocket wheel 112 is rotated it will drive the adjacent chain 40, and through the shaft 27 will drive the other chain and cause a movement of the carriage blocks and feed rollers across the cabinet.

In order to prevent disengagement of the sprocket wheel 112 from the adjacent chain 40, a guide rail 115 may be disposed along one stretch of the chain 40, so as to prevent movement of the chain away from the sprocket wheel. However it is only necessary that the sprocket wheel engage with but one stretch of the chain, in order to be operative, although it may engage with both stretches of the same chain. Thus when the handle 105 is rotated to cause a travel of the carriage blocks and feed rollers across the cabinet, the cam disc 107 will first operate to cam the secondary guide roller 98 from above feed roller 51 before the chains 40 are operated, owing to the relative travel of the pin 113 of the sprocket wheel in the slot 114 of the cam disc before the sprocket wheel and cam disc rotate together. Then after the roller 98 has been shifted from above the feed rollers, the chains will be operated to shift the feed rollers across the interior of the cabinet for a purpose which will be hereinafter explained.

A pair of latch arms 116 (Figures 3 to 6 and 8) are pivoted upon studs 116a (Figure 8) extending from the cabinet walls adjacent the lower ends of the channel strips 26, and each latch arm is provided with a latch nose 117 which is adapted to engage with the lower end of an arm 97 when the latter is cammed rearwardly. A suitable weight 118 on each latch arm serves to urge it normally upwardly into latching engagement with an arm 97. The latching arms 116 extend into proximity to the carriage blocks 41 and are engaged and depressed thereby as the carriage blocks approach their lowermost position, which is shown for example in Figure 5. When the carriage blocks 41 are operated upwardly, the latch arms 116 will be released and will thereupon move into latching engagement with the arms 97 which have been cammed rearwardly into latching position and held in those positions by the running of the cam roller 111 upon the periphery of the cam disc.

By the time the notch 109 of the cam disc moves again into alignment with the cam roller 111 at the end of its first rotation, the carriage blocks will have been elevated sufficiently to permit of the latching of the arms 97 through the latch arms 116. The secondary guide roller 98 will thus be held in its rear-most position against the action of the spring 99 so long as the carriage blocks 41 and the feed rollers are away from their lowermost position shown in Figure 5. This latched position of the feed rollers is shown for example in Figure 6. When the feed rollers are returned to lowermost position by the lowering of the carriage blocks 41, the latter will engage and displace the latch arms 116 sufficiently to release the roller 98 just prior to the completion of the descending movement of the feed rollers. The film strip 92 leaving the primary guide roller 86 passes around the secondary guide roller 98 before passing between the feed rollers 51 and 70 as will be apparent from Figure 3.

Referring now particularly to Figures 3, 4, 11, 12 and 13, the channel strips 26 are provided at suitable points along their lengths, such as midway and at the top, with recesses 119 located in the bottom walls of the channels. Latch elements 120 are pivoted between the arms of the channel strips and in said recesses by pins 121 which pass through the latch elements and between the arms of the channel strips 26. A compression spring 122 is disposed in each recess 119 between the cabinet wall and the latch element 120, so as to normally urge the latch element forwardly out of the channel strip in which it is located. This forward movement is limited by pins 123 which extend between the arms of the channel strips in such positions as to engage the free ends of the latch elements and restrict their outward movement. Each latch element 120 is notched inwardly from its free end and receives a cam roller 124, which is rotatably mounted in the notch by a pin 125, with the cam roller extending beyond the outer face of the latch element so as to engage with faces of a carriage block 41 as the latter moves along that channel strip. Each carriage block is provided upon the face, which is engaged by the latch element 120, with a depression or recess 126 into which the cam roller 124 of a latch element may be snapped as the carriage block passes the latch element. When the cam rollers 124 of opposite latch elements 120 are engaged in the depressions 126 of the two carriage blocks 41, the latter will be yieldingly held in the positions where engaged. Preferably the latch elements are provided at points about half-way along the length of travel of the carriage blocks and also at the upper limits of their travel, but it will be understood that they may also be placed at other intermediate positions, if desired.

The latch elements 120 which are disposed along the channel strips are effective in holding the feed rollers and carriage blocks, which together form a carriage, at the upper limit of their movement or midway of such movement, and it is also desirable that the carriage thus formed by the feed rollers and carriage blocks be held in its lower-most position except during the actual desired movement of the carriage. To this end the carriage blocks 41 may be provided with notches 127 (see Figures 3, 4, 5, 6 and 11) with which the ends of the levers or arms 97 may engage when the arms 97 are released for forward movement and the cam roller 111 snaps into the notch 109 in the cam disc 107. This last position is shown in Figures 3 and 5.

Referring particularly to Figures 3, 7 and 8, a knife blade 128 is carried with its cutting edge extending obliquely between two runners 129 which are slidingly supported upon rails 130, the latter being secured to ribs upstanding from the bottom wall of the cabinet as shown in Figure 7. The runners 129 may carry gear teeth (see Figure 3) with which mesh operating gears 131 carried by a shaft 132, as usual in such machines. The shaft 132 extends exteriorly of the cabinet and carries an operating handle 133 (see Figure 1) by which movement of the knife may be effected. The knife in moving beneath the feed rollers cooperates with an abutment 134 (see Figure 3) to sever the film strip which leaves the feed rollers.

In order to lessen the pressure between the feed rollers 51 and 70, which may be necessary in some cases such as when the film strip is to be inserted therebetween, I may provide an eccentric shaft 135 (see Figure 8), which extends between and is rotatably mounted in opposite side walls of the cabinet adjacent its bottom wall, one wall of the shaft extending exteriorly of the cabinet and carrying an operating handle 136. This eccentric shaft is embraced by arms 137 of blocks which project upwardly from runners 138 that are also mounted to slide upon the rails 130. The runners 138, as well as the runners 129 may have grooves along side faces in the directions of their lengths, which receive the rails 130, the runners being confined to the rails by the walls of the grooves in the bottom walls of the cabinet in which they run.

When the eccentric part of the shaft, which extends through the cabinet, is at its rearmost limit, as shown in Figure 5 for example, the forward ends of the runners 138 will extend into proximity to the depending ends of the arms 68 that are carried by the carriage blocks 41. When the eccentric shaft 135 is operated through 180 degrees, it will shift the runners 138 forwardly and the latter will engage with the arms 68 if the carriage blocks are at their lower limit of movement, and will shift the auxiliary feed roller 70 away from the roller 51 to a slight extent depending upon the throw of the eccentric shaft but sufficient to release the pressure on the film strip which passes between the feed rollers. One may then easily adjust the film strip through the feed rollers and then operate the handle 136 to retract the runners 138, whereupon the feed roller 70 may again engage the film strip and clamp it against the other feed roller 51.

In the use of a machine constructed in this manner, the film strip 92, which has a sensitive emulsion or coating upon both faces, is supported upon the roller 91 in the compartment 90 as usual in such machines, and conducted forwardly between the rollers 94. In order to explain the change in the faces of the end section of a strip which may be presented successively for exposure, the two faces of the strip 92 will be designated A and B, and thus by reference to the various figures showing the film section in different positions, particularly with reference to diagrammatic Figures 16, 17 and 18, one may readily perceive how different faces are presented by the change in the position of the end section of the film strip.

The film strip passes from the rollers 94 upwardly over the primary guide roller 86, and thence downwardly in the focal plane upon which images of the objects to be copied are projected by the lens system 25, thence around beneath a secondary guide roller 98, then over the feed roller 51 and between the latter and the auxiliary feed roller 70. Assuming that the carriage blocks 41 are at their lower limit of movement, as shown for example in Figures 3 and 5, the arms 97 will hold the secondary guide roller 98 forwardly of the focal plane and tangent thereto, and also will hold the carriage blocks 41 located in their lowermost positions. In these positions of the parts, the feed roller 51 should be also approximately tangent to the focal plane which is represented by the position of the section of the film strip which is stretched between the primary guide roller 86 and the secondary guide roller 98.

Through operation of suitable shutters (not shown) the images which are projected will be photographed upon the face A of the end section of the film strip in a manner well known in the art, and then if another image is to be photographed upon the reverse face of the same section of the film strip, this end section of the strip will be reversed in position so as to present its other face B for exposure. To do this the operator will grasp the handle 105 and rotate it counterclockwise as shown by the arrow in Figure 1. At the beginning of this motion the cam disc 107 will be immediately rotated by reason of its keyed connection to the shaft 103 of the handle 105, and as a result will cam out of its notch the roller 111. This causes a rocking of the shaft 96 and a rearward movement of the arms 97, so as to carry the secondary guide roller 98 rearwardly through the focal plane until it is approximately tangent to the same focal plane except upon the rear face thereof, which position will be determined by the running of the roller 111 upon the periphery of the cam disc 107.

During this initial movement the sprocket wheel 112 will be idle, owing to the lost-motion connection provided by the pin 113 and slot 114. Shortly after the roller 111 has been cammed out of the notch 109, the pin 113 will be engaged by an end wall of the slot 114, and the sprocket wheel 112 rotated during the continued movement of the handle 105 in the same direction. Since the sprocket wheel 112 meshes with the adjacent endless chain 40, that chain will now be operated in a direction to elevate the carriage blocks 41 and thus elevate the feed rollers and draw the film strip upwardly across the interior of the cabinet from the secondary guide roller 98.

After the carriage blocks have moved upwardly through a slight extent and before the cam disc 107 has made a complete rotation which would allow the roller 111 to snap into the notch therein again and return the roller 98 forwardly, the latch arms 116 will be released at their forward ends and automatically move upwardly into latching engagement with the arms 97, as shown in Figure 6, and hold the secondary guide roller 98 in its rearward position into which it has been moved against the action of the spring 99. The movement of the chain 40, which meshes with the sprocket wheel, will be transmitted through the shaft 27 to the other sprocket chain and both chains will be operated concomitantly to elevate both carriage blocks 41 equal amounts. The pull upon the film strip during this operation will not withdraw it from the feed rollers, owing to the one-way clutch connection between the disc 62 and the cup 60 which is shown at the right of the feed roller 51 in Figure 7.

As the carriage blocks and feed rollers move, the carriage block 41 having the slot 67 in its lower edge and which is adjacent the paper feed handle 43, will move out of engagement with the tongue 66 on the inner end of the paper feed shaft 35. The shaft 35 will be held against reverse movement by the one way clutch connection to the cabinet wall which is shown particularly in Figures 7 and 9, and will be held against rotation in the other direction by the latch 79.

As the carriage blocks 41 and feed rollers 51 and 70 are moved upwardly by the operation of the endless chains 40, the chains will operate the sprocket wheels 88 and cause a downward movement of the primary guide roller 86 at about one-half the rate of forward travel of the carriage blocks. Thus the movement of the primary guide roller toward the center of the cabinet will release the film section, which has been withdrawn from the compartment 90, as rapidly as it is needed while being drawn upwardly from the lower secondary guide roller 98. It is only necessary for the roller 86 to descend at half the speed of the upward travel of the feed rollers, it being noted that for each increment or downward movement of the roller 86, double the length of that increment of film strip will be released because of the double stretch of the film strip over the roller 86.

When the free end of the film strip has been drawn to a desired distance across the cabinet, such as about midway of the cabinet, the parts will assume the relative positions shown in Figures 6 and 18. At this point the latch elements 120 which are disposed in the channel strips 26, about midway of their length, will snap into yielding engagement with the carriage blocks and yieldingly hold the carriage blocks and feed rollers in that position.

It will be observed, particularly by reference to Figures 16 and 18, that as the feed rollers move upwardly and draw the film strip with it, the face B of the film strip which was rearmost in the position shown in Figure 16, while an image was being photographed upon the face A, will now be foremost in exposure position and the face A which has been exposed will now be rearmost. One may now photograph another image upon this half of the film strip.

If the image to be photographed upon the face B is full size or equivalent in size to the image which was photographed upon the face A, the feed rollers will not be stopped in this midway position for exposure, but operation of the handle 105 will be continued until the carriage blocks 41 reach their uppermost limit of movement where they will be engaged and held yieldingly by the latch elements 120 which are located at the upper end of the channel strip 26. The latch elements which are intermediate the ends of the channel strips 26 will not prevent such continued movement since a slight extra force applied to the handle 105 will overcome the holding effect of the intermediate latch elements and allow the operation to be continued. When the feed rollers have been shifted into their uppermost position, the primary guide roller 86 will have descended into the relative position shown in Figures 4 and 17, and the face B of the complete film end section of which the face A was previously exposed, will now be presented for exposure.

Owing to the relative movement of the primary guide rollers and the feed roller, the reversal in the end setion of the film strip will be effected without drawing further film strip from the compartment 90 or causing movement of any kind of the unexposed supply which is still within the compartment 90. At the same time the end section which is to be exposed will be held in taut position regardless of which face is presented for exposure. By reason of the fact that the secondary guide roller 98 was shifted from its forward position tangent to the focal plane to a rearward position tangent to the focal plane, the film strip which now passes upwardly around the roller 98 and along its opposite side will also lie in the focal plane.

This position of the film strip in the focal plane is also maintained by reason of the fact that the free end passes over the side of the feed roller 51 which was tangent to the focal plane in the original position. Thus regardless of which face of the end section of the film strip is presented for exposure, it will be presented in the same focal plane. The guide rails 80 and 81 for the support of the guide roller 86 may extend slightly rearwardly from the channel strips 26 as they approach the center so that the primary guide roller 86 will clear the focal plane as it moves out of its uppermost position, as will be apparent from an inspection of Figure 17. This movement, however, may be very slight, if at all necessary, and therefore, the travel of the upper primary guide roller 86, to all intents and purposes, may be considered parallel to the travel of the feed rollers.

After an exposure of the B face of the film strip has been made while in this position shown in Figure 17, the handle 105 may be rotated clockwise in order to lower the feed rollers into their initial position and during such lowering the primary guide roller 86 will move upwardly and hold the end section of the film strip taut, and the parts will eventually assume the original positions such as shown in Figures 5 and 16.

As the carriage blocks 41 reach their lowermost positions, they will depress the latch levers 116 releasing the arms 97, whereupon the spring 99 will shift the arms 97 and the secondary guide roller 98 forwardly above the feed roller 51, so as to position the film strip in the same focal plane. During this return of the feed rollers to normal position, the tongue 66 will move into the carriage block 41 which is adjacent the handle 43, and will again become clutched to the feed roller 51.

If now one desires to remove the exposed section of the film strip for development, the latch 79 will be operated to release the handle 43 and to withdraw the pin from the aperture 77 of the gear 76, whereupon the operator rotates the crank handle 43 in a direction permitted by its one-way clutch connection to the cabinet. During this movement the shaft 35, which is clutched to the feed roller 51, will rotate the latter in a direction to propel the exposed section of the film strip downwardly between the feed rollers; and this operation will be continued until the aperture 77 of the gear 76 again moves into alignment with the pin on the spring 78 (see Figure 1) whereupon the engagement of the pin in the aperture will stop further rotation and release the latch 79 permitting it to move into a position to stop the handle 43 in the position shown in Figures 1 and 7.

During the rotation of the handle 43, the engagement of the pin of the spring 78 with the surface of the gear 76 will hold the latch 79 out of the path of the handle 43 until the desired film movement has been accomplished. The gear ratio between the pinion 75 and the gear 76 will be such as to cause a movement of all of the exposed film section through between the feed rollers, during which movement a fresh unexposed section of the film strip will be drawn into a position for exposure. The knife handle 133 may then be operated to sever the film strip which has been drawn through between the feed rollers. The machine is now ready for a repetition of the operation.

It will be understood that various changes in the various details, which have been herein described and illustrated in order to explain the nature of the invention, may be made by those skilled in the art within the principle and scope of the invention as expressed in the appended claims.

I claim as my invention:

1. In a photographic copying machine for exposing a strip of photographic film having both faces sensitized, the combination of optical means for projecting images upon a selected focal plane, a guide for said strip located in the rear of and approximately midway of the image area of the focal plane, primary and secondary guides located adjacent opposite margins of said area of said focal plane, said strip passing from said first guide over said primary guide, then in said focal plane to the secondary guide, strip feeding means receiving and gripping the strip leaving said secondary guide, and means for causing relative shifting of said primary and secondary guides and said feeding means to reverse the faces of the film strip section that may be in the focal plane, without severing the strip and without drawing it further through said first mentioned guide.

2. In a photographic copying machine for exposing a strip of photographic film having both faces sensitized, the combination of optical means for projecting images upon a selected focal plane, a guide for said strip located in the rear of and approximately midway of the image area of the focal plane, primary and secondary guides located adjacent opposite margins of said area of said focal plane, said strip passing from said first guide over said primary guide, then in said focal plane to the secondary guide, strip feeding means receiving and gripping the strip leaving said secondary guide, and means for reversing the faces of the strip section that may be in said focal plane, to enable photographing successively upon opposite faces of that section, said reversing means comprising mechanism for shifting said primary guide, over which the strip passes when first leaving said first guide, to a point approximately half-way across the image area of said focal plane, shifting said feeding means across said image area into approximately the marginal position formerly occupied by said primary guide, and for shifting said secondary guide transversely of the focal plane sufficiently to bring the film section into the focal plane.

3. In a photographic copying machine for exposing a strip of photographic film having both faces sensitized, the combination of optical means for projecting images upon a selected focal plane, a receiving guide through which the strip passes located approximately midway of the image area projected upon the focal plane, a primary guide for receiving the film strip and guiding it into and through said focal plane, a secondary guide for receiving the strip leaving said primary guide and holding the interposed strip section in the focal plane, means for holding the free end of the strip leaving the secondary guide, and means for shifting said last named means and said primary guide in opposite directions parallel to the focal plane for reversing the faces of the strip presented to the projected image in the focal plane.

4. In a photographic copying machine for exposing a strip of photographic film having both faces sensitized, the combination of optical means for projecting images upon a selected focal plane, a receiving guide through which the strip passes located approximately midway of the image area projected upon the focal plane, a primary guide for receiving the film strip and guiding it into and through said focal plane, a secondary guide for receiving the strip leaving said primary guide and holding the interposed strip section in the focal plane, means for holding the free end of the strip leaving the secondary guide, and means for shifting said last named means and said primary guide in opposite directions parallel to the focal plane for reversing the faces of the strip presented to the projected image in the focal plane and for shifting said secondary guide transversely of the focal plane in order to maintain the strip section in the focal plane as its faces are reversed.

5. In a photographic copying machine for exposing a strip of flexible photographic film having both faces sensitized, the combination of optical means for projecting images upon a selected area of a focal plane, primary and secondary guides for conducting the free end section of the film strip into and out of the focal plane respectively, and located at adjacent opposite margins of said area, means for drawing the free end of said strip in a direction across the focal plane from said secondary guide and for shifting said primary guide sufficiently to permit of such drawing movement independently of the body of the strip, whereby opposite faces of the end section of said strip will be presented successively for photographic recording of said images.

6. In a photographic copying machine, a cabinet, optical means associated with the cabinet for projecting images upon a selected focal plane in said cabinet, a carriage mounted in said cabinet for movement approximately parallel to the focal plane and having feed rollers rotatably mounted thereon, primary and secondary guides disposed adjacent opposite margins of the image area of said focal plane for directing a photographic film through said focal plane and thence to said feeding rollers, said feeding rollers being pressed together to clamp the film, and held against reverse rotation, whereby when the carriage is shifted across the cabinet, a film strip passing between the primary and secondary guides and to said rollers will be drawn across the cabinet, and means for shifting said carriage across the cabinet and for shifting said primary guide sufficiently to permit of said drawing of the film strip independently of the body of the strip.

7. In a photographic copying machine, a cabinet, guides along opposite walls of the cabinet, a shaft extending across the cabinet adjacent a wall and having sprocket wheels thereon adjacent the walls for the guides, sprocket wheels rotatably mounted adjacent the walls having the guides and oppositely across the cabinet from said shaft, endless chains extending along the walls having guides and connecting the sprocket wheels on said shaft with the other sprocket wheels and a carriage extending across the cabinet and guided by said guides, said carriage having a connection to said chain, whereby when said shaft is rotated, said carriage will be shifted across said cabinet, said carriage including film gripping means whereby when the carriage is shifted across the cabinet it will draw a film strip across the same.

8. In a photographic copying machine, a cabinet, guides along opposite walls of the cabinet, a shaft extending across the cabinet adjacent a wall and having sprocket wheels thereon adjacent the walls for the guides, sprocket wheels rotatably mounted adjacent the walls having the guides and oppositely across the cabinet from said shaft, endless chains extending along the walls having guides and connecting the sprocket wheels on said shaft with the other sprocket wheels, a carriage extending across the cabinet and guided by said guides, said carriage having a connection to said chain, whereby when said shaft is rotated, said carriage will be shifted across said cabinet, said carriage including film gripping means whereby when the carriage is shifted across the cabinet it will draw a film strip across the same, and spring pressed latches arranged along the walls having the guides for engagement with said carriage at different points in its travel across the cabinet for yieldingly holding said carriage in different positions in its travel across the cabinet.

9. In a photographic copying machine, a cabinet, a carriage extending across said cabinet, said carriage and cabinet have cooperating means for guiding the carriage transversely across the interior of the cabinet, a primary guide roller disposed adjacent one limit of the carriage travel and supported for movement in a direction transversely of the cabinet and parallel to the carriage travel, an endless chain connected to said carriage and extending parallel to its travel, whereby when the chain is operated it will propel the carriage across the cabinet, a sprocket wheel associated with the primary guide roller and operably driven from said chain, a rack element carried by said cabinet and meshing with said sprocket wheel, whereby when the carriage is shifted across the cabinet by said chain the primary guide roller will be shifted in the opposite direction across said cabinet, and a secondary film guide for receiving a film strip from said primary guide and directing it to said carriage.

10. In a photographic copying machine, primary and secondary film guides disposed adjacent opposite walls of said cabinet, the primary guide being movable in a direction toward the secondary guide and the secondary guide being movable in a direction transverse to the movement of the primary guide, and means for receiving a film strip from said secondary guide and shiftable across said cabinet to draw a film strip over said secondary guide and across said cabinet, and means for shifting said film receiving means and said primary guide concomitantly in directions across the cabinet for reversing the faces of the end section of the film strip, the movement of said secondary guide enabling the positioning of the end section of the film strip in a desired focal plane regardless of which face of this strip section is presented forwardly.

11. In a photographic copying machine, a cabinet, endless chains disposed along opposite walls thereof, a primary film guide disposed adjacent one wall of the cabinet and slidable in a direction parallel to the travel of said chains, a sprocket wheel carried by said guide and meshing with one of said chains, a rack element carried by said cabinet and with which said sprocket wheel also meshes, whereby when the chains are operated, the primary guide will be shifted in a direction across the cabinet, a secondary guide in said cabinet toward and from which said primary guide moves during its operation by said chains, and film gripping means extending between said chains and operated thereby across the cabinet when said chains are operated, whereby when a film strip is connected between said primary and secondary guides and then to said gripping means it will have one face presented for photographic purposes, and when the chains are operated said film strip will be drawn across the cabinet in a manner to present the other face for photographic purposes.

12. In a photographic copying machine, a cabinet, a pair of endless chains disposed along the inner faces of opposite walls of said cabinet, a carriage extending between the chains and connected thereto for movement thereby across the cabinet and including film feeding rollers extending in a direction between the chains, a primary guide roller extending across the cabinet between the walls along which the chains extend and operable by the chains in a direction reverse to the travel of said carriage, and a secondary guide roller toward and from which said primary guide moves when the carriage is shifted by said chains, whereby when a film strip is conducted between said primary and secondary guides and thence to said carriage, a movement of the carriage across the cabinet will reverse the faces of said film strip.

13. In a photographic copying machine, a cabinet, a pair of endless chains disposed along the inner faces of opposite walls of said cabinet, a carriage extending between the chains and connected thereto for movement thereby across the cabinet and including film feeding rollers extending in a direction between the chains, a primary guide roller extending across the cabinet between the walls along which the chains extend and operable by the chains in a direction reverse to the travel of said carriage, and a secondary guide roller toward and from which said primary guide moves when the carriage is shifted by said chains, whereby when a film strip is conducted between said primary and secondary guides and thence to said carriage, a movement of the carriage across the cabinet will reverse the faces of said film strip, said secondary guide being shiftable transversely of the travel of the carriage to maintain the film strip in the same plane regardless of which face is presented.

14. In a photographic copying machine, a cabinet, a pair of endless chains disposed along the inner faces of opposite walls of said cabinet, a carriage extending between the chains and connected thereto for movement thereby across the cabinet and including film feeding rollers extending in a direction between the chains, a primary guide roller extending across the cabinet between the walls along which the chains extend and operable by the chains in a direction reverse to the travel of said carriage, a secondary guide roller toward and from which said primary guide moves when the carriage is shifted by said chains, whereby when a film strip is conducted between said primary and secondary guides and thence to said carriage, a movement of the carriage across the cabinet will reverse the faces of said film strip, said secondary guide being shiftable transversely of the travel of the carriage to maintain the film strip in the same plane regardless of which face is presented, and common means for operating said chains and shifting said secondary guide automatically.

15. In a photographic copying machine, a cabinet, a primary film guide disposed against one wall of the cabinet, a film gripping means disposed adjacent the opposite wall of the cabinet, said gripping means and primary guide being shiftable in opposite directions across the cabinet, common means for shifting said means to various extents across the cabinet and for shifting said primary guide roller in the opposite direction to the travel of said gripping means, and a secondary guide for engaging a film strip passing between said primary guide and gripping means, whereby when the gripping means and primary guide are shifted, the faces of an interconnected film strip will be reversed.

16. In a photographic copying machine, a cabinet, a primary film guide disposed against one wall of the cabinet, a film gripping means disposed adjacent the opposite wall of the cabinet, said gripping means and primary guide being shiftable in opposite directions across the cabinet, common means for shifting said means to various extents across the cabinet and for shifting said primary guide roller in the opposite direction to the travel of said gripping means, and a secondary guide for engaging a film strip passing between said primary guide and gripping means, whereby when the gripping means and primary guide are shifted, the faces of an interconnected film strip will be reversed, said secondary guide being shiftable transversely of the travel of said gripping means in order to maintain the presented film strip in the same focal plane regardless of which face is presented.

17. In a photographic copying machine, a camera, a carriage shiftable across the camera and including a pair of feed rollers geared together for receiving and holding a film and causing its movement therebetween when operated, and when shifted drawing said film across the camera to present its reverse face for exposure, relatively stationary operating means for one of said feed rollers separably coupled thereto when the carriage is in its normal position, whereby when said carriage moves away from normal position said feed rollers will be uncoupled automatically from said operating means, and means associated with one of said feed rollers for preventing their movement in a direction to release a film strip which may be clamped between them.

18. In a photographic copying machine, a camera having a focal plane upon which images are to be projected a film magazine, means for guiding film from said magazine to present successive sections in said plane for exposure, a feeding device for receiving the film from said guides and drawing it through said plane, said device being movable approximately rectilinearly across the interior of the camera to present the reverse face of the film in said focal plane, and operating means for said feeding device carried by the camera and separably coupled to said device when in one position, whereby as the device moves into and out of said one position it will be automatically coupled to and uncoupled from said operating means.

19. In a photographic copying machine, a cabinet, a carriage shiftable across the interior of the cabinet and including a pair of feed rollers geared together for rotation concomitantly in a direction to propel a film strip therebetween, means for preventing a reverse movement of said rollers, one of said rollers having a transversely extending slot, a rotatable operating element carried by said cabinet and having engagement with said slot when the slotted roller is in alignment therewith, whereby operation of said element will operate said rollers, said carriage being movable across the cabinet only when the slot is positioned parallel to the direction of travel of said carriage whereby when the carriage moves across the interior of the cabinet, it will be disengaged from said operating means.

20. In a photographic copying machine, a cabinet, channel strips extending along opposite walls of said cabinet and facing one another, a carriage slidable on said channel strips across the interior of said cabinet and having means for receiving and gripping a film strip which is to be drawn across the interior of the cabinet, a chain extending along said channel strips and connected to said carriage for operating it along the channel strips and a latch element pivoted in one of said channel strips and spring pressed outwardly for engagement with the carriage and means carried by said channel strips for limiting the outward movement of said latch, said carriage having a recess with which said latch engages as the carriage passes to yieldingly hold it in an adjusted position along said channel strips.

21. In a photographic copying machine, a cabinet, primary and secondary guides disposed adjacent opposite walls of said cabinet and between which a film strip may be stretched, means normally positioned adjacent one of said guides for gripping the film strip leaving said adjacent guide, means for directing a film strip to said guide which is normally furthest from the gripping means, and means for shifting said gripping means across the cabinet and producing relative movement of said guides for reversing the film strip which extends across the cabinet to present the reverse face for photographic purposes.

22. In a photographic copying machine, a cabinet, guide means in said cabinet for holding a section of a film strip in stretched relation across the interior of the cabinet for photographic purposes, and means for receiving the free end of the strip and drawing it across the interior of the cabinet in a reverse direction and for causing relative movement of said guides to permit of said drawing without movement of the body of said strip, whereby the other face of said strip may be presented for photographic purposes.

23. In a photographic copying machine, a cabinet, guide means in said cabinet for holding a section of a film strip in stretched relation across the interior of the cabinet for photographic purposes, and means for receiving the free end of the strip and drawing it across the interior of the cabinet in a reverse direction and for causing relative movement of said guides to permit of said drawing without movement of the body of said strip, whereby the other face of said strip may be presented for photographic purposes, the relative movement of said guides maintaining the strip in the same focal plane regardless of which face is presented for photographic purposes.

24. In a photographic copying machine, a cabinet, optical means for projecting images upon a selected focal plane in said cabinet, a film guide located in the rear of and approximately midway of the image area of the focal plane, primary and secondary guides located adjacent opposite margins of said image area of said plane, whereby a film strip may be passed through said first guide, then to said primary guide, then to the secondary guide, means for gripping the free end of the strip and holding it against reverse movement over said guides, means for causing relative shifting of said guides and gripping means to reverse the film strip which is stretched across the cabinet and in said focal plane, and present the reverse face for photographic purposes.

25. In a photographic copying machine, a cabinet, a relatively fixed support in said cabinet for a supply of film strip to be photographically exposed in sections, guiding means in said cabinet between which a section of the film is stretched for exposure by passage from the film strip support in one direction, and means for drawing said section through said guiding means across the cabinet in the reverse direction to present the other face of that section for exposure.

26. In a photographic copying machine, a cabinet, a support in said cabinet for a supply of film strip to be photographically exposed in sections, primary and secondary guides in said cabinet between which a section of the film strip is stretched for exposure, means for receiving the strip from the secondary guide and drawing it over the latter and across the cabinet in a reverse direction to present the other face of that section for exposure.

27. In a photographic copying machine, a cabinet, a support in said cabinet for a supply of film strip to be photographically exposed in sections, guiding means in said cabinet for receiving the strip from said support and holding successive sections in stretched relation across the cabinet for exposure, and means for drawing a section in exposed position across the cabinet in a reverese direction to present its other face for exposure, said guiding means and drawing means being interconnected to cause a relative movement of the component parts of said guiding means to permit of said drawing movement without material movement of the body of the unexposed film strip.

28. In a photographic copying machine, a cabinet a relatively fixed support in said cabinet for a supply of film strip to be photographically exposed in sections, guiding means in said cabinet for receiving the strip from said support and holding successive sections in stretched relation across the cabinet for exposure, and means for drawing a section in exposed position across the cabinet in a reverse direction to present its other face for exposure and for shifting said guiding means to hold said section in substantially the same plane, regardless of which face is presented for exposure.

29. In a photographic copying machine, a cabinet a support in said cabinet for a supply of film strip to be photographically exposed in sections, guiding means in said cabinet for receiving the strip from said support and holding successive sections in stretched relation across the cabinet for exposure, and means for drawing a section in exposed position across the cabinet in a reverse direction to present its other face for exposure and for shifting said guiding means to hold said section in substantially the same plane, regardless of which face is presented for exposure, said guiding means and drawing means being interconnected to cause a relative movement of the component parts of said guiding means to permit of said drawing movement without material movement of the body of the unexposed film strip.

30. The combination with a photographic camera, having a relatively fixed roll holder for a sensitive film strip, of means for drawing a section of film from the roll holder into the focal plane of the camera to present one side for exposure, and means for then reversing such section to present its other side for exposure while the section is still continuous with the strip.

31. The combination with a photographic camera, having a relatively fixed roll holder for a sensitive film strip, of means for drawing a section of film from the roll holder into the focal plane of the camera to present one side for exposure, and means for then reversing such section to present its other side for exposure while the section is still continuous with the strip, said means being reversible to restore the section to initial position.

32. The combination with a photographic camera, having a relatively fixed film magazine with means for drawing a section of a film strip from the magazine into the focal plane of the camera, means for exposing said section and means for carrying opposite ends of the exposed section in opposite directions to reverse the section and present the other side for exposure without detachment of the section from the strip.

33. The combination with a photographic camera, having a film magazine of a movable guide over which the film is looped and a relatively fixed guide to which it passes therefrom, to place the interposed section of the film in the focal plane for exposure, a gripping device for the free end of the film section, and means for moving said gripping device across the focal plane to reverse the section and present its other side for exposure and for operating the movable guide to shorten the loop of film and compensate for such movement of the section.

34. In a photographic camera adapted to expose first one side and then the other side of a film strip sensitized upon both sides, the combination with a camera body and a lens of means for feeding a continuous strip of double coated film into the focal plane of the camera, a pair of supports within the camera over which the film is fed to maintain it in the focal plane, and means for moving said supports relatively to reverse the stretch of film that initially passes into the focal plane in order to expose the opposite side thereof to the camera lens.

35. In a photographic camera adapted to expose first one side and then the other side of a film strip sensitized upon both sides, the combination with a camera body and a lens of means for feeding a continuous strip of double coated film into the focal plane of the camera, a pair of supports within the camera over which the film is fed to maintain it in the focal plane, means for reversing the relative positions of said supports to reverse the stretch of film that initially passes into the focal plane in order to expose the opposite side thereof to the camera lens.

36. In a photographic camera adapted to expose first one side and then the other side of a film strip sensitized upon both sides, the combination with a camera body and a lens of means for feeding a continuous strip of double coated film into the focal plane of the camera, a pair of supports within the camera over which the film is fed to maintain it in the focal plane, and means for moving said supports relatively to reverse the stretch of film that initially passes into the focal plane in order to expose the opposite side thereof to the camera lens, one of said supports consisting of a drawing means adapted to both pull the film and to clamp the end thereof during the relative movement of the two supports.

37. In a photographic camera adapted to expose first one side and then the other side of a film strip sensitized upon both sides, the combination with a camera body and a lens of means for feeding a continuous strip of double coated film into the focal plane of the camera, a pair of supports within the camera over which the film is fed to maintain it in the focal plane, means for moving said supports relatively to reverse the stretch of film that initially passes into the focal plane in order to expose the opposite side thereof to the camera lens, and means for limiting the relative movement of the supports to regulate the length of film which is reversibly exposed in the focal plane.

38. In a photographic camera adapted to expose first one side and then the other side of a film strip sensitized upon both sides, the combination with a camera body and a lens of means for feeding a continuous strip of double coated film into the focal plane of the camera a pair of supports within the camera over which the film is fed to maintain it in the focal plane, one of said supports comprising a drawing and holding means, a guide roll with which said last mentioned support cooperates in its manipulation of the film, and means for altering the position of said guide roll whereby the reversal of the film through the movement of the first mentioned supports will dispose it in a reversed position in its original plane of exposure.

39. In a photographing apparatus, an exposing chamber for film, means for drawing film into the exposing chamber for exposure and for moving the film endwise and reversing the same for exposure of its opposite side, and means for removing the film from the exposing chamber.

40. In a photographing apparatus, an exposing chamber for film, means for holding film in the exposing chamber for exposure, means for moving the film endwise out of the field of light projecting means of the apparatus and for returning the film to said field in reversed position for exposure of its opposite side, and means for moving the film from the exposing chamber.

41. In a photographing apparatus, an exposing chamber for duplex film, means for drawing film into the exposing chamber and holding it therein for exposure on one side, means for moving the film endwise and reversing the said film for exposure on the opposite side, means for cutting the doubly exposed film from a web of film, and means for removing the doubly exposed portion of the film from the exposing chamber.

42. In a photographing apparatus, an exposing chamber associated with means for exposing films therein, to which double coated films are delivered in position to expose one side thereof, means for moving the film endwise in the exposing chamber and reversing the position of the film with respect to the exposing means, and means for focusing the apparatus when the film is in said positions.

43. In a photographing apparatus, an exposing chamber for film, means for drawing film into the exposing chamber for exposure and for moving the film endwise and reversing the same for exposure of its opposite side.

44. In a photographic apparatus, an exposing chamber for film, means for drawing a continuous film strip into the exposing chamber for exposure and for moving the film endwise and reversing the same for exposure of its opposite side and sheet severing mechanism adapted to cut off from the strip the doubly exposed section so that it may be removed and the next following film section exposed.

PAUL LANDROCK.